United States Patent

[11] 3,626,224

[72] Inventors John G. Vigneault;
Francis A. Horning, both of South Bend, Ind.
[21] Appl. No. 42,111
[22] Filed June 1, 1970
[45] Patented Dec. 7, 1971
[73] Assignee The Bendix Corporation

[54] WHEEL SPEED SENSOR FOR AN ADAPTIVE BRAKING SYSTEM HAVING A ROTATING TONE WHEEL AND ELECTROMAGNETIC PICKUP MEANS
7 Claims, 7 Drawing Figs.

[52] U.S. Cl. .................................................. 310/168, 310/120, 105/118, 295/36
[51] Int. Cl. ............................................................. H02k 17/42
[50] Field of Search .............................................. 310/79–82, 168–171, 112, 114, 120, 121, 123; 74/11–13; 73/529; 324/174; 179/100.2 T; 295/36, 43; 105/61, 217, 118, 215 C; 180/55; 317/5; 303/20, 21

[56] References Cited
UNITED STATES PATENTS

| | | | |
|---|---|---|---|
| 1,707,579 | 3/1931 | Hoffman | 74/12 |
| 3,482,130 | 12/1969 | Woodward | 310/168 |
| 555,492 | 3/1896 | Bonney | 73/529 |
| 3,447,838 | 6/1969 | Haviland | 188/181 |
| Re.22,549 | 9/1944 | Pensler | 310/82 |
| 3,315,544 | 4/1967 | Wickman | 74/12 |
| 3,482,129 | 12/1969 | Riordan | 310/168 |

*Primary Examiner*—D. F. Duggan
*Assistant Examiner*—R. Skudy
*Attorneys*—William N. Antonis and Hartz, Smith and Thompson Plante ABSTRACT: A cup-shaped drive wheel with an elastomeric friction ring secured to the inside surface of the rim of the cup for driving a combination of a driven wheel and a tone wheel element positioned inside the cup. The cup is large enough to be positioned over the axle flange of an automobile and can be secured by being clamped between the brake drum and the outer face of the flange. The tone wheel is a toothed gear which operates in conjunction with a magnetic pickup to give a signal representative of wheel speed.

PATENTED DEC 7 1971

INVENTORS
JOHN G. VIGNEAULT
& FRANCIS A. HORNING
BY Plante, Areny, Hartz,
Smith & Thompson
ATTORNEYS INVENTORS
JOHN G. VIGNEAULT &
FRANCIS A. HORNING
BY Plante, Arens, Hartz
Smith & Thompson
ATTORNEYS

WHEEL SPEED SENSOR FOR AN ADAPTIVE BRAKING SYSTEM HAVING A ROTATING TONE WHEEL AND ELECTROMAGNETIC PICKUP MEANS

SUMMARY OF THE INVENTION

This invention relates to an adaptive braking system for use on an automobile. More specifically it relates to the wheel speed sensor which provides the adaptive braking system with information relative to the speed and acceleration of one of the several wheels of an automotive vehicle. An adaptive braking system of the type in which the invention could be used is described in U.S. Pat. No. 3,494,671. Wheel speed sensors of the same general class, and of which this is an improvement, are described in U.S. Pat. Application Ser. No. 42,111, filed June 1, 1970 having a common assignee with this application.

If the use of antiskid adaptive brake systems follows the usual practices of the automobile industry, they will be made available for quite a few years as extra cost options rather than being incorporated in all vehicles as standard equipment. This makes it a requisite that the special mechanisms of the adaptive braking system be readily applied to the vehicle on the assembly line. It is particularly desirable that any disassembly of traditionally subassembled components, such as rear axles, not be required, or at least be reduced to a practical minimum.

Therefore, it is an object of this invention to provide a wheel speed sensor particularly adaptable to rear axles which requires minimal disassembly of the axle to enable the sensor to be mounted upon those vehicles which are to be equipped with the adaptive braking system.

It is further object of this invention to provide a wheel speed sensor which does not require that the rear axle is removed from the rear axle housing in order to mount the sensor.

A problem arising from sensors of the type which include a large diameter tone wheel mounted on the axle and an electromagnetic pickup mounted on the axle housing has been the creation of spurious signals due to deflection of the axle parts and consequent variation of the clearance between the signal generating elements of the tone wheel and the pickup. It is a still further object of this invention to provide a sensor which is free of such problems by maintaining a fixed permanent clearance between the toe wheel and the pickup.

Another problem of wheel speed sensors has been to construct them to provide an adequate number of discreet signals so that it is possible to interpret these signals even when the vehicle speed has been reduced as low as 3 to 5 miles an hour. Thus, even further object of this invention is to provide a practical maximum number or frequency of signals to improve the low speed effectiveness of the system.

DETAILED DESCRIPTION OF THE INVENTION

Figure 1:
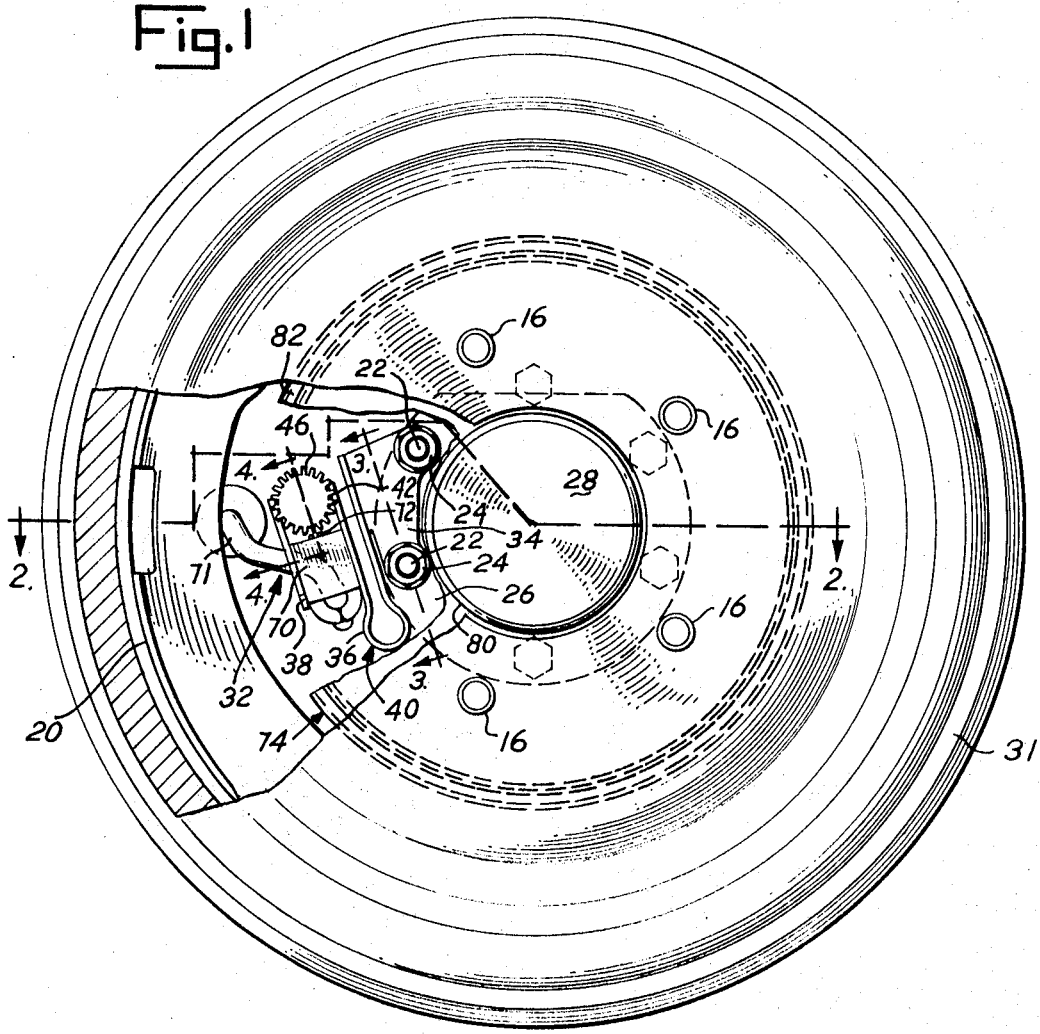
FIG. 1 is a view looking at the end of an automobile rear axle assembly with the wheel removed and with the brake drum and friction drive wheel partly sectioned to show the tone wheel, driven wheel, and pickup assembly.
Figure 2:
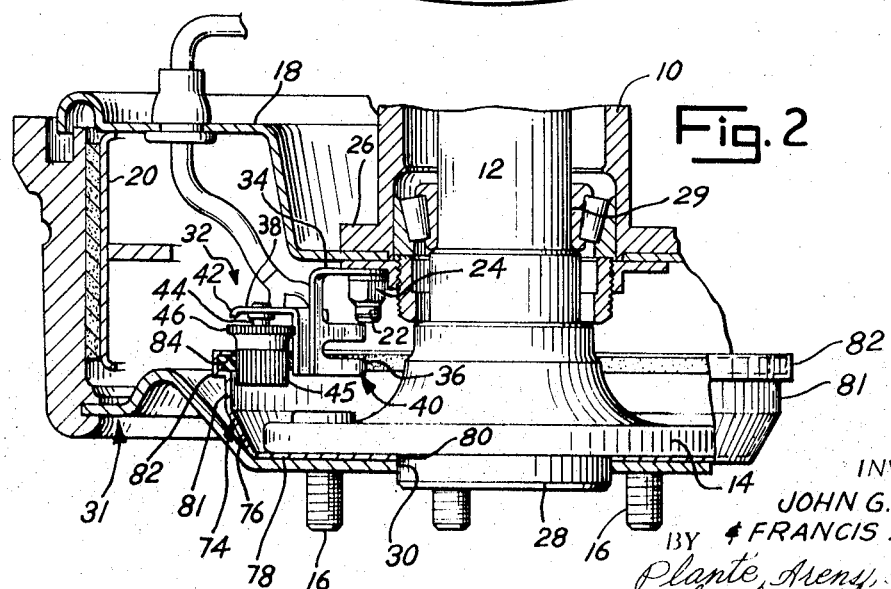
FIG. 2 is a sectional view taken along line II—II of FIG. 1.

FIGS. 1 and 2 shown a conventional rear axle housing 10 containing an axle 12 formed with a flange 14 into which are passed the usual wheel mounting bolts 16. A brake backing plate 18 to which are attached the usual parts of brake, such as the shoes 20, is mounted by bolts 22 and nuts 24 to a flange 26 of the axle housing 10. The outer face of the axle flange 14 is formed with a pilot projection 28 which usually is made accurately concentric with the bearing surfaces 29 of the axle 12. The central bore 30 of a brake drum 31 pilots on the projection 28 and the drum 31 is held in place by being clamped between the wheel (not shown) and the axle flange 14.

In carrying out the present invention, there is a driven wheel and tone wheel pickup assembly indicated generally by the numeral 32 which includes a bracket portion 34. The bracket portion 34 is attached to the axle housing 10 by moving two of the nuts 24, placing the two mounting holes of the bracket over the screws 22 and replacing the nuts 24. A C-shaped leaf spring element 36 and structural elements 38 for mounting the tone wheel, driven wheel and pickup are illustrated as comprising integral parts of a single stamping 40 made from sheet metal of ferromagnetic material such as steel. The structural elements 38 formed generally in the shape of a box with one open side and one open end. The side of the box opposite the open side is extended lengthwise from the open end, with a shallow U-section for strength, to provide an arm 42 into which is riveted a shaft 44.

Figure 3:
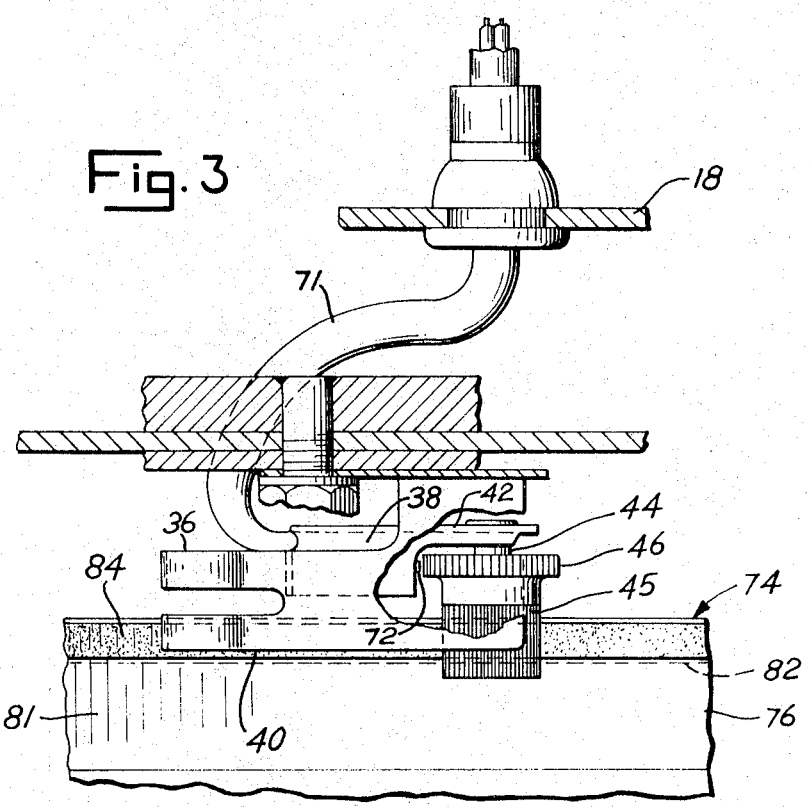
FIG. 3 is a sectional view taken along line III—III of FIG. 1.
Figure 4:
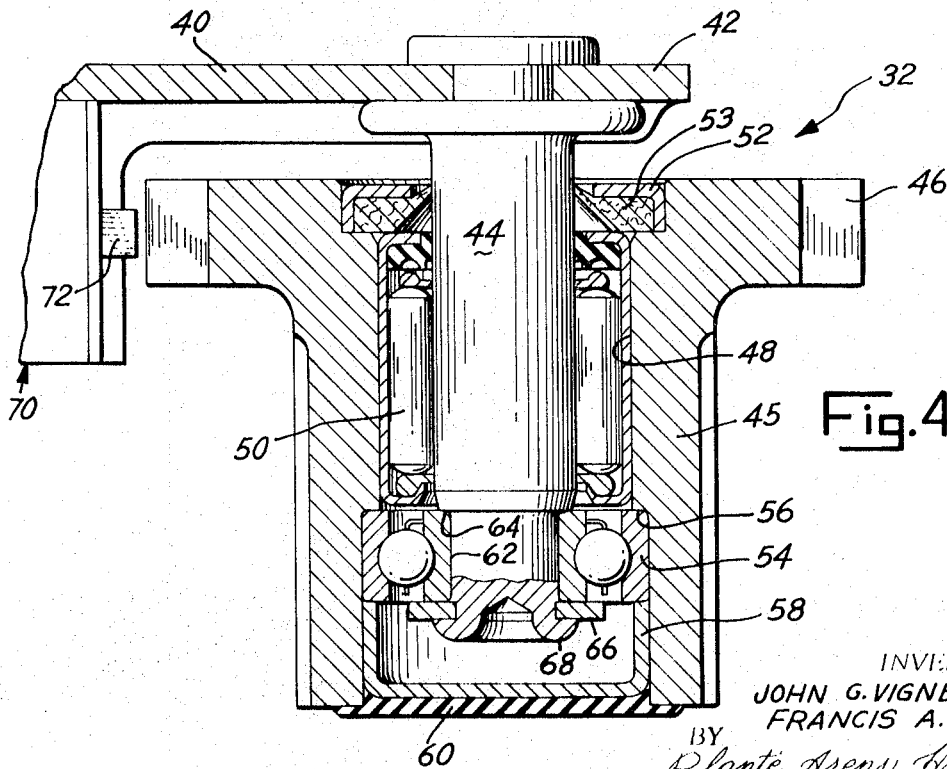
FIG. 4 is an enlarged sectional view showing in detail the structure of the tone wheel, driven wheel, pickup assembly.

Referring now to FIGS. 3 and 4 in conjunction with FIGS. 1 and 2, the driven wheel is a generally cylindrical element 45 (later referred to as the driven wheel) having a flange at one end formed with teeth resembling gear teeth to constitute the signal generating elements of the tone wheel 46. The tone wheel 46 and cylindrical element 45 are an integral structure which could be fabricated by machining from a bar of ferromagnetic material such as steel. The teeth or signal generating elements must be of such material. The tone wheel 46 might be a separate piece of suitable material riveted or otherwise attached to a driven wheel fabricated to some other material such as aluminum. It should also be understood that the unitary stamping 40 may be replaced by several parts riveted, spot-welded or otherwise securely fastened together.

The cylindrical element 45 is formed with a through bore 48 in which is pressed a roller bearing 50 rotatably seated on the shaft 44. The bore 48 has enlarged portions at each end. The enlarged portion at the upper end, as seen in FIG. 4, receives a pressed-in dirt excluding cap 52 for retaining the leather seal 53 which also engages the shaft 44. The enlarged portion at the lower end of the bore 48 has pressed into it a ball bearing 54 which is seated against a shoulder 56 and held by a pressed-in cup-shaped stamping 58 which closes the open end of the bore 48. After this cup 58 is installed it is sealed by the application of a sealing compound 60. The inner race of the ball bearing 54 is mounted on a reduced diameter portion 62 of the shaft 44 and is held against a shoulder 64 by a washer 66 and a rivet-formed shoulder 68. Thus installed, the ball bearing forms an axial positioner and thrust taker for the driven wheel 45. The pickup, indicated generally by the numeral 70, consists of a coil (not shown), suitable wiring harness 71, a permanent magnet (not shown) and pole pieces 72. The permanent magnet is positioned in the box-shaped portion of the structural elements 38 with the pole pieces 72 projecting at the open end into proximity with the teeth of the tone wheel 46. The pole pieces 72 are secured in place by the application of a potting compound. If a removable shim of suitable dimensions is placed between the pole pieces 72 and the tone wheel 46 while the potting compound is hardening, a permanent fixed clearance will be established.

To complete the wheel speed sensor, a friction drive wheel 74 in the form of a large cup-shaped element 76 is provided. The cup-shaped element 76 consists of a flat bottom portion 78 having a central opening 80 which fits closely over the pilot projection 28 of the axle 12. Generally cylindrical part 81 is of greater diameter than the axle flange 14 so that the cup 76 can be readily placed thereover with the inner margin of the cylindrical part 81 inside of the vehicle brake. This inner margin is formed with a groove or channel 82 which opens inwardly. An elastomeric friction drive ring 84 of generally square cross section is seated in the groove 82 and secured therein as by any conventional method such as cementing. It is a feature of the invention that, after being cemented in place, the inner surface of the elastomeric drive ring 84 can be finished so that it accurately concentric with the central opening 80 in the flat bottom portion 78 of the cup-shaped element 76. Grinding is a method of making the elastomeric ring accurately concentric.

In operation, the spring 36 supports and positions the driven wheel 45, tone wheel 46, and pickup assembly 32 into tight, but resilient, contact with the inner surface of the friction drive ring 84 so that the driven wheel 74 and tone wheel 46 can be rotated at very high speed. It should be observed that, due to the large diameter of the drive wheel 74, a very large ratio of speed increase can be provided, so that, even if the tone wheel 46 is made relatively small to fit in the confined spaces available and therefore is equipped with relatively few signal generating elements, it is still possible to obtain a very large number of discrete signals per unit of vehicle speed. As the tone wheel 46 rotates, its teeth are alternately aligned and not aligned with the pole pieces 72, causing a variation of magnetic flux therein and inducing an alternating voltage in the pickup 70 which is transmitted via the wiring harness 71 to a computer (not shown) of the adaptive braking system.

Figure 5:
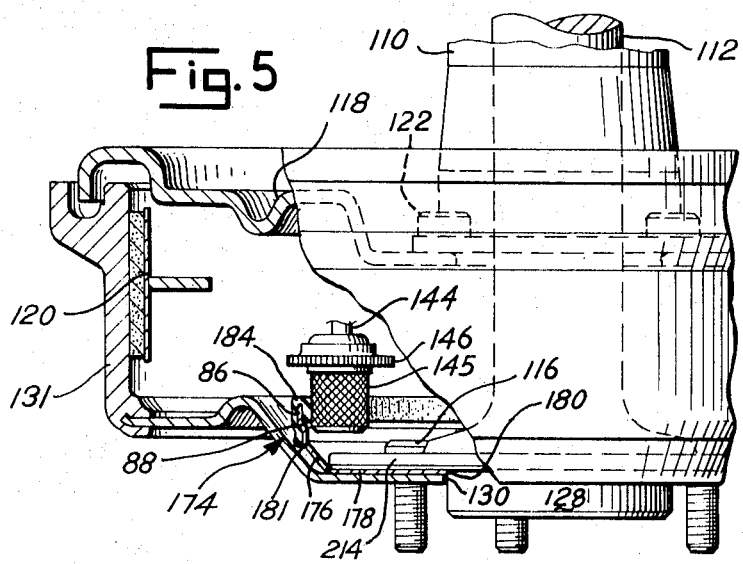
FIG. 5 is a schematic view of another form of friction drive wheel.

Referring now to FIG. 5 which illustrates another form of friction drive wheel, like parts are designated by the same numerals plus 100. In this arrangement the friction drive wheel 174 comprises a similar cup-shaped stamping 176 having the flat bottom portion 178 and generally cylindrical parts 181, but the inner margin of the cylindrical parts comprises a cylindrical flange 86 and a short radially offset portion 88. The elastomeric friction ring 184 is molded in a flattened C-shape so that the opening of the C closely fits the cylindrical flange 86, and with the outer leg of the C elongated so that it extends past and snaps over the radially offset portion 88 to securely hold the friction ring 184 in place.

Figure 6:
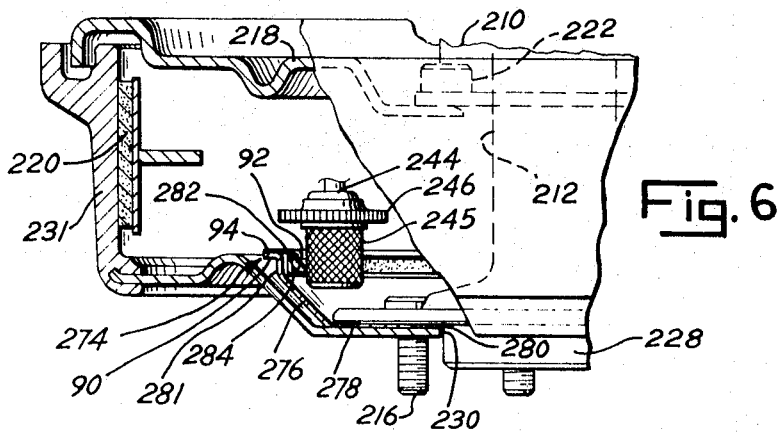
FIG. 6 is a schematic view of still another form of friction drive wheel.

In the arrangement of FIG. 6, like parts are designated by the same numerals increased by 200. In this arrangement the inner margin of the cup-shaped stamping 276 is terminated in a short radial flange 90. The elastomeric friction ring 284 is generally a square cross section like that of FIGS. 1 and 2 but is is seated in a deep groove or channel 282 formed in a separate ring-shaped stamping 92 which is also formed with a short radial flange 94. The two stampings 276 and 92 are secured together, preferably by spot welding through the two flanges 90 and 94, while the two parts are held in a fixture which assures that the inner surface of the elastomeric friction ring 284 is truly concentric with the central opening 280 which fits over the pilot projection 228 of the axle flange 214. By this means the rather costly operation of grinding the innner surface of the elastomeric ring is eliminated.

Figure 7:
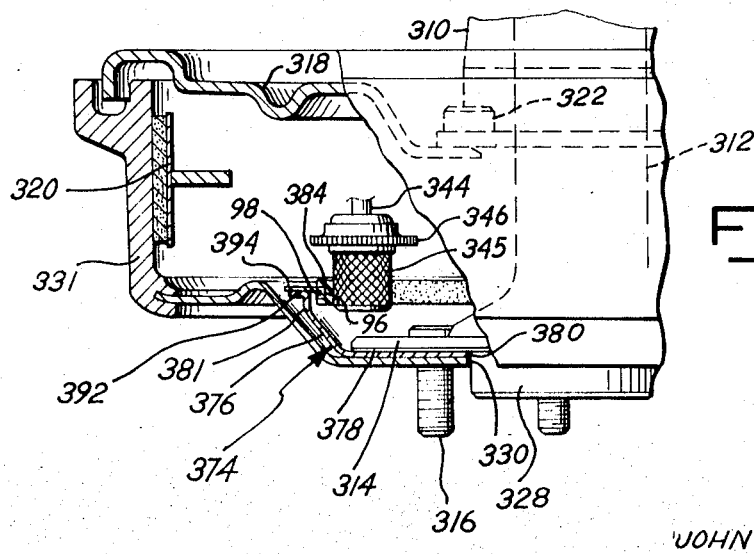
FIG. 7 is a schematic view of yet another form of friction drive wheel.

In FIG. 7, like parts are designated by the same numerals plus 300. In this form of the invention the cup-shaped stamping 376 is of the same shape as 276 of FIG. 6, but the elastomeric friction ring 384 is formed with a U-shaped cross section providing an external groove or channel 96 into which is fitted a mating U-shaped section 98 of the separate ring-shaped stamping 392. Again the two stampings 376 and 392 may be spot-welded together while being held in a fixture to insure proper roundness and concentricity.

I claim:

1. A wheel speed sensor for use on a wheel of a vehicle having an axle and axle housing, said axle including a large diameter flange with a pilot projection formed on its outer surface, said sensor comprising:
    a friction drive wheel;
    a driven wheel operatively connected to said friction drive wheel;
    a tone wheel connected to the driven wheel;
    pickup means in close proximity with said tone wheel for generating a signal representative of the velocity of said vehicle wheel;
    means for combining the driven wheel, tone wheel and pickup into an assembly, said assembly being attached to said axle housing;
    said friction drive wheel being characterized by a large cup-shaped element including a surface with a central opening fitting closely on said pilot projection, generally cylindrical portions extending inwardly past said large diameter flange, a cylindrical flange and a short radially offset portion formed at an inner margin of the cylindrical portions, and an elastomeric friction ring including a C-shaped cross section fitted to the cylindrical flange, and an elongated outer leg of the C-shaped cross section which extends past and snaps over the radially offset portion.

2. The wheel speed sensor of claim 1 in which the inner surface of the elastomeric friction drive ring engages the driven wheel.

3. The wheel speed sensor of claim 1 in which the elastomeric friction ring is finished concentric to the central opening after being secured in place on the cylindrical flange.

4. A wheel speed sensor for use on a wheel of a vehicle having an axle including a large diameter flange with a pilot projection formed on an outer surface and having a housing surrounding said axle, comprising:
    a friction drive wheel;
    a driven wheel operatively connected to said friction drive wheel to cause rotation of said driven wheel as a function of the velocity of said vehicle wheel;
    a tone wheel connected to said driven wheel and rotating therewith;
    pickup means for detecting the rotational velocity of said tone wheel; and
    means for combining the driven wheel, tone wheel, and pickup means into an assembly for attachment to said axle housing;
    said friction drive wheel being characterized by a large cup-shaped element including a surface with a central opening fitting closely on said pilot projection, generally cylindrical portions extending inwardly past said large diameter flange, and an elastomeric friction drive ring secured at the inner margin of the cylindrical portion;
    said elastomeric friction drive ring being concentric to said central opening after being secured at the inner margin of said cylindrical portions 5. The wheel speed sensor of claim 6 in which the separate ring-shaped stamping is formed with a deep groove or channel and the elastomeric friction ring is of generally square cross section seated in said groove or channel.

6. A wheel speed sensor for use on a rear wheel of a vehicle having an axle and axle housing, said axle including a large diameter flange with a pilot diameter formed on its outer surface, said sensor comprising:
    a friction drive wheel;
    a driven tone wheel operatively connected to said friction drive wheel;
    pickup means for determining the rotational velocity of said tone wheel;
    means for combing the driven tone wheel and pickup means into an assembly attached to said axle housing;
    characterized by the friction drive wheel including a large cup-shaped element having a surface with a central opening fitting closely on said pilot diameter, generally cylindrical portions extending inwardly past said axle flange, a short radial flange terminating at an inner margin of the cylindrical portions, a separate ring-shaped stamping having a second short radial flange spot-welded to the first radial flange, and an elastomeric friction ring secured to said separate ring-shaped stamping said separate ring-shaped stamping being formed with a groove, said elastomeric friction ring being of generally square cross section seated in said groove.

7. A wheel speed sensor for use on a wheel of a vehicle having an axle and axle housing, said axle including a large diameter flange with a pilot diameter formed on its outer surface, said sensor comprising:
    friction drive wheel;
    a driven tone wheel operatively connected to said friction drive wheel;
    pickup means for determining the rotational velocity of said tone wheel;

means for combining the driven tone wheel and pickup means into an assembly attached to said axle housing; characterized by the friction drive wheel including a large cup-shaped element having a surface with a central opening fitting closely on said pilot diameter, generally cylindrical portions extending inwardly past said axle flange, a short radial flange terminating an inner margin of the cylindrical portions, a separate ring-shpaed stamping having a second short radial flange spot-welded to the first radial flange, and an elastomeric friction ring secured to said separate ring-shaped stamping, said elastomeric friction ring being formed with a U-shaped cross section providing an external channel, the separate ring-shaped stamping being provided with a mating U-shaped section which is fitted into said channel.

* * * * *